May 29, 1951 J. A. BARBER 2,554,728
ELECTRICAL SWITCH FOR ANIMAL TRAPS
Filed Oct. 22, 1948 2 Sheets-Sheet 1
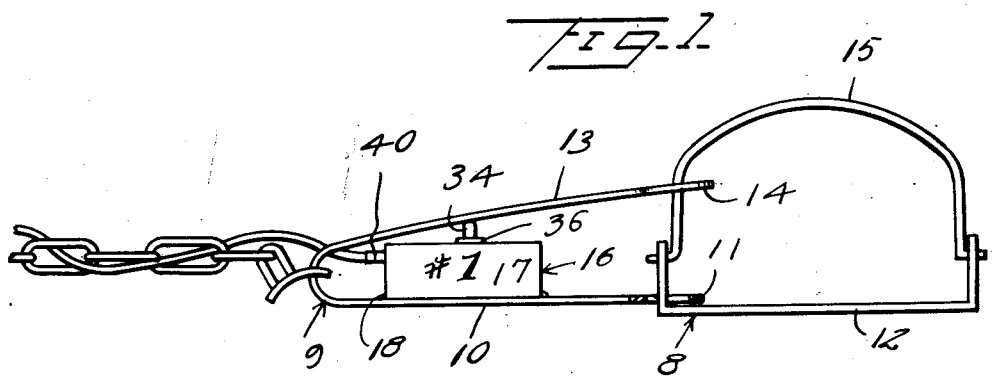
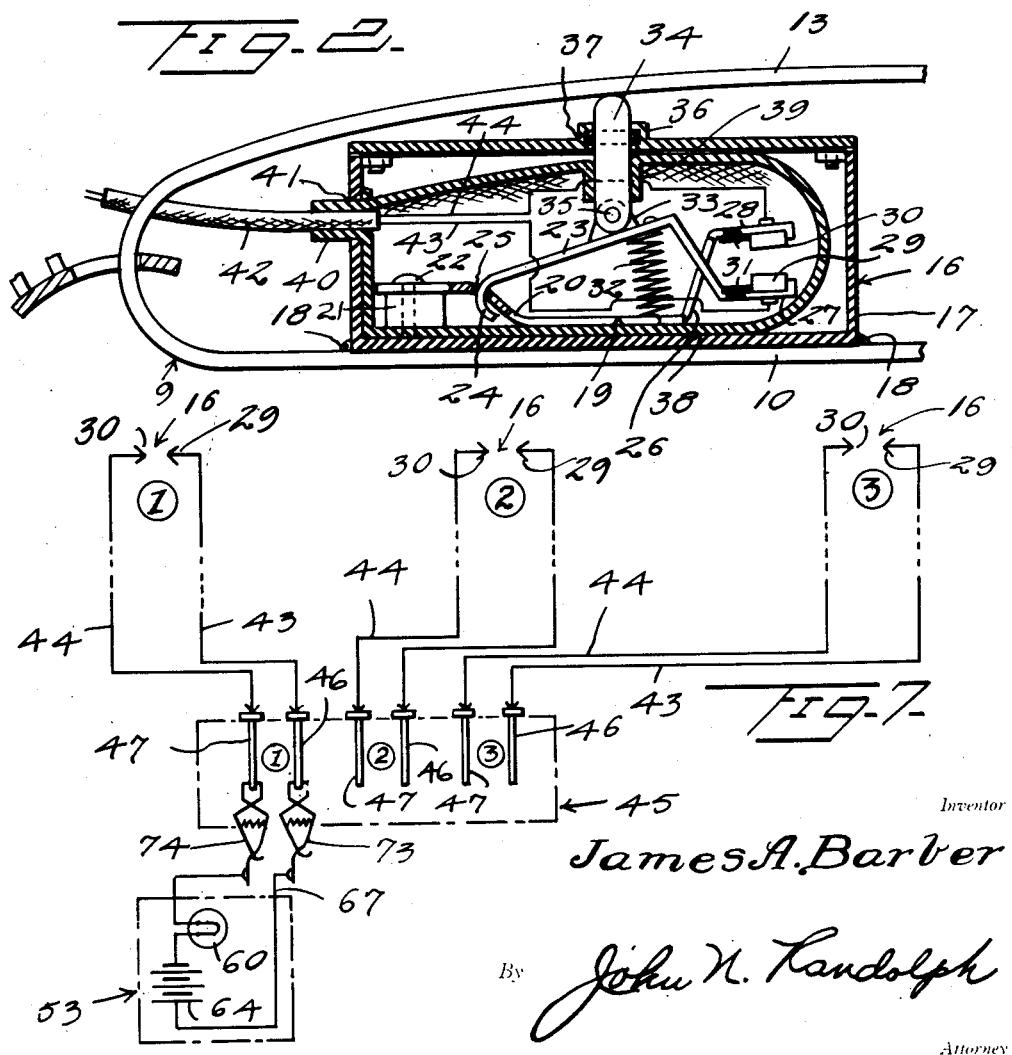
Inventor
James A. Barber
By John N. Randolph
Attorney May 29, 1951　　　　　　　J. A. BARBER　　　　　　2,554,728
ELECTRICAL SWITCH FOR ANIMAL TRAPS
Filed Oct. 22, 1948　　　　　　　　　　　　2 Sheets-Sheet 2
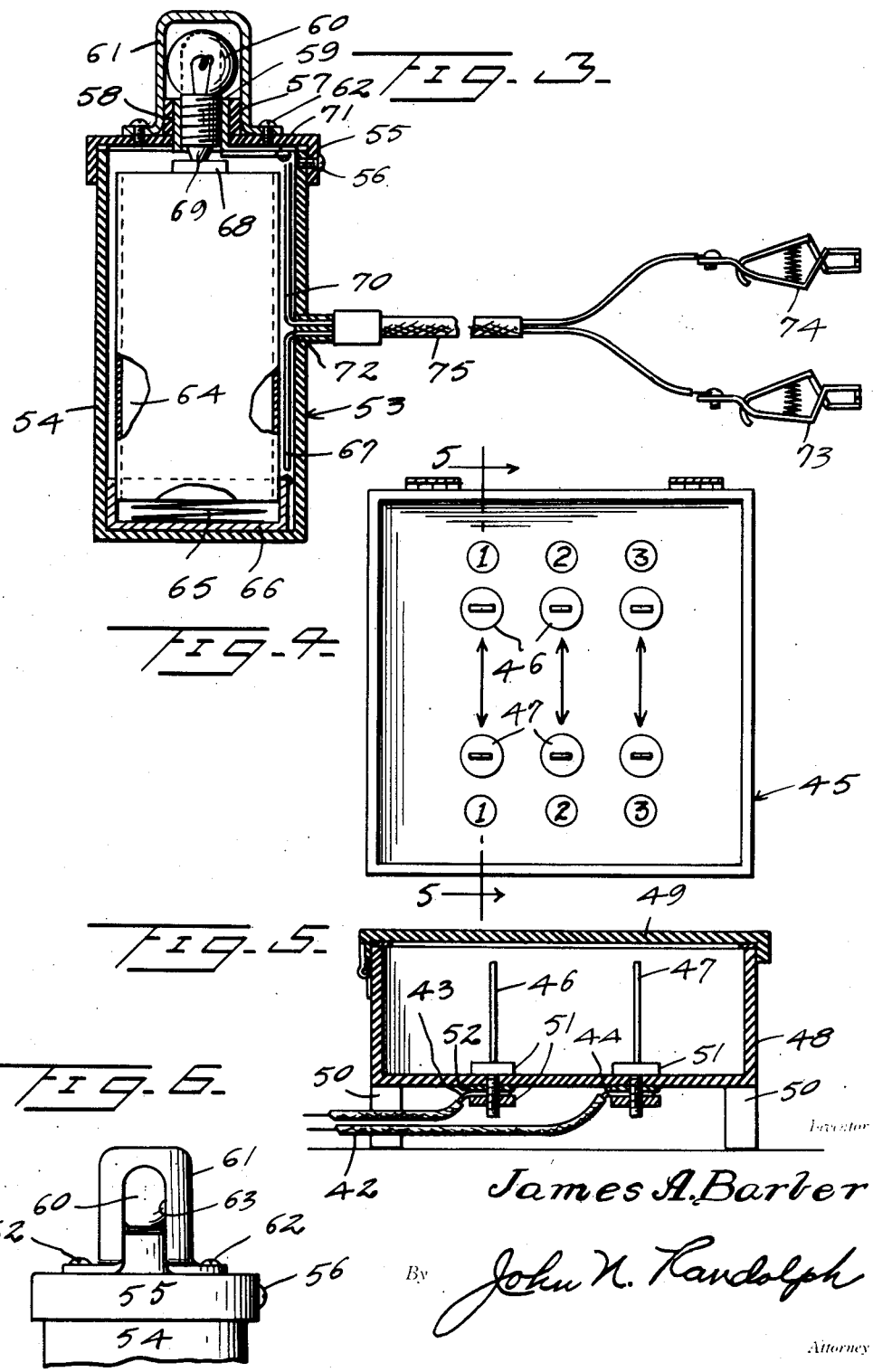

Patented May 29, 1951

2,554,728

UNITED STATES PATENT OFFICE 2,554,728

ELECTRICAL SWITCH FOR ANIMAL TRAPS

James A. Barber, Franklinton, La.

Application October 22, 1948, Serial No. 55,911

2 Claims. (Cl. 200—52)

This invention relates to an electrical unit adapted to be connected to a plurality of animal traps for providing electrical connections from each of the animal traps to a remotely disposed central station from which the condition of each trap can be readily determined from an electrical signal for indicating which of the traps are still set and which have been tripped thereby saving the trapper the necessity of personally inspecting the traps which are still set and requiring him to go only to the traps which have been tripped for removing the catch and resetting the traps.

Another object of the invention is to provide an electric signal including a plurality of electric switches each associated with an animal trap and which switches will be actuated by release of the trap from a set position so that the trapper through the utilization of a portable signal unit may ascertain the condition of each of his traps from a central station by attaching said unit to posts connected by electrical conductors to each of the trap switches.

Various other objects and advantages of the invention will hereinafter become more fully apparent from the following description of the drawings, illustrating a presently preferred embodiment thereof, and wherein:

Figure 1 is a side elevational view of a conventional animal trap showing an electric switch, forming a part of the invention applied thereto;

Figure 2 is an enlarged side elevational view of a portion of the trap showing the switch partly in section and partly in side elevation applied thereto and disposed in a circuit interrupting position;

Figure 3 is a side elevational view, partly in vertical section illustrating the portable signal unit constituting a part of the invention;

Figure 4 is a top plan view of the central station or check box, constituting another part of the invention, shown with the cover thereof removed or in an open position;

Figure 5 is a vertical sectional view of the check box or central station taken substantially along a plane as indicated by the line 5—5 of Figure 4 and showing the cover thereof in a closed position;

Figure 6 is a side elevational view of the upper portion of the signal box including the visual indicator thereof, and Figure 7 is a diagrammatic view of the entire invention showing the electrical connection of the various units thereof.

Referring more specifically to the drawings, a conventional animal trap is illustrated in Figure 1 and designated generally 8 and includes a spring member, designated generally 9 comprising a bar of spring metal one end of which forms a base portion 10 having an eye 11 at the terminal thereof which is connected to the base 12 of the trap 8. The spring 9 is turned back upon itself intermediate of its ends and the other end portion 13 thereof is disposed over the first mentioned portion 10 and terminates in an eye 14 for slidably engaging complementary legs of the trap jaws 15 for moving said jaws to a closed position in a conventional manner when the trap is tripped or released. The trap 8 including the parts 9 to 15 inclusive, are of conventional construction and have been illustrated and briefly described merely to better illustrate the application and function of the trap switch, designated generally 16, and constituting a part of the invention.

The trap switch 16, as best illustrated in Figure 2 includes a housing or casing 17 the bottom of which rests on and is supported by the spring base 10 and secured thereto in any suitable manner as by means of a bonding medium as indicated at 18 for fixedly positioning the switch 16 with respect to the spring 9. A clamp-type switch, designated generally 19, is disposed in the switch housing 17 and includes a section comprising a bar 20 one end of which is supported on a block 21 and anchored to the housing 17 by a fastening 22. The other section of the clamp 19 includes a bar 23 having a hook 24 at one end thereof which engages in an opening 25 of the bar 20 for pivotally connecting the clamp sections 20 and 23. Said sections or bars 20 and 23 extend from their portions 25 and 24, respectively in diverging relationship and are provided with angularly extending corresponding shank portions 26 of restricted width which are arranged in crossed relationship and which terminate in outwardly projecting substantially parallel jaws 27 and 28, respectively to the inner sides of which are secured electrical contacts 29 and 30, respectively which are arranged in opposed relationship. The portions of the jaws 27 and 28 to which the contacts 29 and 30 are connected are preferably insulated from the remainder of the bars 20 and 23, respectively, by electrical insulators 31. An expansion coiled spring 32 is interposed between the diverging portions of the bars 20 and 23 for normally urging said portions away from one another for moving the jaws 27 and 28 toward one another and so that the contacts 29 and 30 will normally be in engagement for closing the switch 16. The diverging portion of the upper bar or section 23 is provided with an upstanding ear 33 to which one end of a plunger 34 is connected by a pivot pin 35. The plunger 34 extends upwardly from the ear 33 reciprocally through a flanged opening 36 in the top wall of the housing 16, the flange of which is internally grooved to receive a gasket or ring 37 which is slidably engaged by the plunger 34 and which seals the opening 36 around said plunger. The upper end of the plunger 34 is held in engagement with the upper trap spring portion 13 by the switch spring 32.

Figure 1 shows the trap 8 in a released position and with the plunger 34 projecting with respect to the housing 17, in which position the contacts 29 and 30 would be in engagement or in a circuit closing position. Figure 2 shows the spring 9 in the position that it will assume when the trap is set and with the plunger 34 depressed by the trap spring portion 13 for retaining the jaws 27 and 28 and their contacts 29 and 30 in open positions, as illustrated in Figure 2.

The switch member 19 is enclosed in a casing of waterproof material such as rubber as seen at 38 in Figure 2 which in turn is disposed in the housing 17. The flexible waterproof casing 38 has a flanged opening 39 through which the plunger 34 extends and a second flanged opening 40 which extends outwardly through an opening 41 in an end wall of the housing 17 for receiving a tube of waterproof material 42 which extends inwardly through said opening 40 and which encloses a pair of electrical conductors 43 and 44, corresponding ends of which are connected to the contacts 29 and 30.

The conductors 43 and 44, incased in the tube 42, extend from the switch 16 to a remotely disposed central station or check box 45 as illustrated in Figures 4 and 5 and which contains a plurality of pairs of contact posts each including a contact post 46 and a contact post 47. The contact posts 46 and 47 rise from the bottom of a box or housing 48 and are normally enclosed therein by a hinged cover 49. The box 48 is preferably formed of electrical insulating material and the bottom thereof which is preferably supported in an elevated position by depending legs 50 has openings therein through which the lower ends of the posts 46 and 47 extend. Said lower ends of the posts are threaded to receive nuts 51 disposed above and beneath said bottom and by which said posts are clamped thereto and at least one of which additionally functions with a washer 52 for clamping the opposite end of the conductor 43 to the post 46 and the opposite end of the conductor 44 to the post 47. Said last mentioned ends of the conductors 43 and 44 are likewise exposed with respect to the casing 42.

As illustrated in Figure 4, the central station or check box 45 is shown provided with three pairs of posts 46 and 47 which pairs are numbered "1," "2" and "3" and as seen in Figure 1, the switch 16 is numbered "1" and would be connected to the posts of the check box which are likewise numbered "1." It will likewise be apparent that switches connected to two other traps, corresponding to trap 8 and numbered "2" and "3," not shown, would be connected by similar conductors 43 and 44 to the posts 46 and 47 numbered "2" and "3" and it will likewise be readily apparent that these three traps could be remotely disposed with respect to one another. It will also be obvious that while only three sets of posts 46 and 47 have been illustrated for the purpose of simplicity, that ordinarily the check box or central station 45 would include a far greater number of such sets of posts each connected to the switch of an animal trap 8.

In addition to the units 16 and 45, the invention also includes an electrical signal unit, designated generally 53 and comprising a box 54 of electrical insulating material having a removable closure 55 normally secured in an applied position by a screw 56 and which closure is provided with a flanged opening 57 containing an internally threaded sleeve or bushing 58 of electrical conducting material forming a socket to threadedly engage the base conductor 59 of a small lamp bulb 60, the globe of which projects upwardly from said flanged opening 57 and is normally enclosed in a removable shield 61 which is detachably secured by fastenings 62 to the cover 55. The shield 61 has one or more openings 63 in its side wall, as seen in Figure 6, for exposing a portion of the globe of the bulb 60 so that it can be readily ascertained when the bulb is energized. As seen in Figure 3, the housing 54 contains a conventional dry cell battery 64 which is supported on an expansion spring 65 which engages the negative or base contact of said battery and which also engages an electrical conductor member 66, mounted in the bottom of the housing 54 and which is connected to an electrical conductor 67. The spring 65 retains the other, positive contact 68 of the battery 64 in engagement with the end contact 69 of the bulb 60. A conductor 70 is connected at one end to an extension arm 71 of conducting material which extends from the sleeve 58. The conductors 67 and 70 extend from the housing 54 through an opening 72 thereof and are each provided at their opposite end with a conventional type post engaging clamp of electrical conducting material, which clamps are designated 73 and 74, respectively. The portions of the conductors 67 and 70 which are disposed externally of the housing 54, except the ends thereof located adjacent the clamps 73 and 74 are preferably enclosed in a waterproof tubing 75.

From the foregoing it will be readily apparent that the self contained signal unit 53 may be readily carried by the trapper to the central station or check box 45 where, with the cover 49 in an open position, the clamps 73 and 74 may be connected to the complementary posts 46 and 47. Assuming that the clamps are connected to the posts of the check box numbered "1" if the trap 8 to which the switch 16 numbered "1" is attached is still set, as illustrated in Figure 2 the circuit thereof will be interrupted by the switch contacts 29 and 30 being in opened position so that the lamp bulb 60 will not be energized. If, on the other hand, the trap 8 has been sprung as seen in Figure 1 the contacts 29 and 30 will be in engagement and a circuit will be closed through the conductors 43 and 44 and posts 46 and 47 to the conductors 67 and 70 through the battery 64 and bulb 60 so that the bulb 60 will be energized for indicating that the trap "1" has been released. Each of the traps is thus checked at the central station or check box 45 and the trapper may then go only to the trap which has been released for removing the catch and resetting said trap, thereby saving the time which would otherwise be lost in making an unnecessary inspection of the other traps.

Obviously, if desired, an audible indicator can be substituted for the visual indicator 60 and various other modifications and changes are likewise contemplated and may obviously be resorted to, without departing from the spirit or scope of the invention as hereinafter defined by the appended claims.

I claim as my invention:

1. A trap spring operated circuit closer comprising an electric switch provided with a pair of electric contacts, spring means normally retaining the contacts in a circuit closing position, a housing enclosing the contacts and spring means adapted to be mounted between the legs of a trap spring, said housing having a bottom wall secured to one leg of the trap spring and having a top wall facing the other trap spring leg, a plunger extending reciprocally through the housing top wall having an inner end connected to one of said contacts and an outer end bearing against the last mentioned trap spring leg and normally retained thereby in a retracted position in the housing when the trap spring is disposed in a set position, said spring means functioning to project the plunger outwardly of the housing top wall and to move the contacts to a circuit closing position when the trap spring legs are released to spring away from one another.

2. An electric switch comprising a housing, a pair of electrical contacts disposed within said housing, spring means connected to and urging the contacts into a circuit closing position, a plunger having an inner end connected to one of said contacts, said plunger being reciprocally mounted in a wall of the housing and having an opposite end disposed externally thereof, said plunger being displaceable inwardly of the housing for moving the contact to which it is connected out of engagement with the other contact and against the action of said spring means, said spring means normally urging the contacts into engagement with one another and said plunger into a projected position relatively to the housing, a stationary arm secured in the housing having an upwardly offset end to the underside of which, the other stationary contact is secured, a second arm pivotally connected at one end thereof to the first mentioned arm having a downwardly offset end disposed beneath the upwardly offset end of the stationary arm and to which, the first mentioned movable contact is secured in opposed relationship to said stationary contact, the first mentioned end of said plunger being connected to the second arm and connected thereby to the movable contact, and said spring means being disposed between portions of said arms and normally urging the second arm away from the stationary arm for displacing the movable contact into engagement with the stationary contact.

JAMES A. BARBER.

REFERENCES CITED

The following references are of record in the file of this patent:

UNITED STATES PATENTS

| Number | Name | Date |
| --- | --- | --- |
| 489,212 | Bartlett | Jan. 3, 1893 |
| 1,244,634 | Neff et al. | Oct. 30, 1917 |
| 1,326,380 | Veigel | Dec. 30, 1919 |
| 1,594,287 | Wehmann | July 7, 1926 |
| 2,435,514 | Ross | Feb. 3, 1948 |
| 2,457,153 | Hubbell | Dec. 28, 1948 |